United States Patent Office 3,466,366
Patented Sept. 9, 1969

3,466,366
METHOD OF CONTROLLING BACTERIA WITH AN ORGANOBISMUTH ETHYLENIC CARBOXYLATE AND POLYMER THEREOF
John R. Leebrick, Roselle Park, N.J., assignor to M & T Chemicals Inc., New York, N.Y., a corporation of Delaware
No Drawing. Original application May 15, 1963, Ser. No. 280,720, now Patent No. 3,350,436, dated Oct. 31, 1967. Divided and this application Oct. 21, 1966, Ser. No. 600,312
Int. Cl. A61k 27/00; C09d 5/14
U.S. Cl. 424—80          10 Claims

ABSTRACT OF THE DISCLOSURE

This invention relates to a process for controlling the growth of bacteria with an organobismuth polymer.

---

This invention relates to novel organobismuth compounds, novel polymers prepared therefrom and methods for preparing the said compounds and polymers. This application is a divisional application of application Ser. No. 280,720, filed May 15, 1963, now U.S. Patent 3,350,436.

It is an object of this invention to provide novel organobismuth compounds and methods for their preparation. It is a further object to provide novel organobismuth polymers. This invention also provides novel biologically active compositions. Other objects will be apparent to one skilled in the art upon reading the following description.

In accordance with certain of its aspects, this invention relates to novel organobismuth compounds selected from the group consisting of $R_aBi(OOCR')_{3-a}$ and $Ar_3Bi(OOCR')_2$ wherein R is selected from the group consisting of alkyl radicals of less than 20 carbon atoms, alkenyl radicals of less than 20 carbon atoms, cycloalkyl radicals, and monocyclic aryl radicals; Ar is a monocyclic aryl radical; R' is a polymerizable radical selected from the group consisting of the vinyl, $\alpha$-alkylvinyl, and vinylphenyl radicals; and $a$ is an integer less than 3.

In accordance with certain of its embodiments the novel organobismuth compound may contain the group —OOCR' wherein R' is the vinyl radical. The organobismuth compound may then be an ester of acrylic acid, i.e. an organobismuth acrylate.

The organobismuth compounds of this invention may contain the group —OOCR' wherein R' is an $\alpha$-alkylvinyl radical and the compound may be an ester of an $\alpha$-alkylacrylic acid, i.e., an organobismuth $\alpha$-alkylacrylate. Preferred $\alpha$-alkylacrylates are those wherein the $\alpha$-alkyl substituent contains 1–4 carbon atoms, e.g. methacrylates, ethacrylates, $\alpha$-propylacrylates, $\alpha$-butylacrylates, etc. Most preferably, the $\alpha$-alkyl substituent may be methyl.

Other organobismuth compounds of this invention may be those containing the group —OOCR' wherein R' is a vinylphenyl radical. The organobismuth compound may then be an organobismuth vinylbenzoate. The vinylphenyl radical R' may be an o-vinylphenyl, m-vinylphenyl, or p-vinylphenyl radical. Preferably, it may be a p-vinylphenyl radical.

The organobismuth compounds may be of the form $R_aBi(OOCR')_{3-a}$ wherein $a$ is an integer less than 3, i.e. 1 or 2, R' is as defined supra, and R is selected from the group consisting of alkyl radicals of less than 20 carbon atoms, alkenyl radicals of less than 20 carbon atoms, cycloalkyl radicals, and monocyclic aryl radicals.

R may be an alkyl radical of less than 20 carbon atoms including methyl, ethyl, n-propyl, isopropyl, n-butyl, isobutyl, tert-butyl, sec.-butyl, amyl, hexyl, octyl, decyl, dodecyl, hexadecyl, octadecyl, etc. radicals. Preferably, when R is an alkyl radical, R may contain 1–8 carbon atoms. R may also be an alkyl radical carrying an inert substituent, i.e. a substituent which is not reactive toward the organobismuth compound itself or the reactants from which it is prepared. Typical inert substituents may include halogens, alkyl, aryl, ether, etc. substituents. Typical inertly substituted R radicals may include the 4-chlorobutyl, 2-ethyhexyl, w-phenylpropyl, 2-ethoxyethyl, etc. radicals. Preferred organobismuth compounds wherein R is alkyl may include:

Di-n-butylbismuth methacrylate
Di-n-propylbismuth acrylate
Di-n-octylbismuth p-vinylbenzoate
Diamylbismuth ethacrylate
Di-isopropylbismuth methacrylate
Di-sec-butylbismuth acrylate
Di-n-butylbismuth m-vinylbenzoate
Dihexylbismuth p-vinylbenzoate
Di-n-butylbismuth o-vinylbenzoate
n-Butylbismuth bis acrylate
n-Propylbismuth bis methacrylate
n-Octylbismuth bis p-vinylbenzoate
2-ethylhexybismuth bis acrylate
Hexylbismuth bis m-vinylbenzoate
w-Phenylpropylbismuth bis methacrylate
Isopropylbismuth bis ethacrylate, etc.

R may be an alkenyl radical of less than 20 carbon atoms such as an allyl, 1-propenyl, 2-butenyl, 1-butenyl, 3-pentenyl, hexenyl, octenyl, decenyl, dodecenyl, hexadecenyl, octadecenyl, etc. radical. Preferred alkenyl radicals may be those containing less than about 8 carbon atoms. R may also be an alkenyl radical carrying an inert substituent, e.g. a halogen, alkyl, aryl, ether, etc. substituent. Typical inertly substituted alkenyl radicals may include chlorobutenyl, isopropenyl, 2 - ethylhexenyl, w-phenylhexenyl, ethoxybutenyl, etc. radicals. Preferred organobismuth compounds wherein R is alkenyl may include:

Diallylbismuth acrylate
Divinylbismuth methacrylate
Di-2-butenylbismuth p-vinylbenzoate
Di-3-pentenylbismuth m-vinylbenzoate
Dioctenylbismuth ethacrylate
Hexenylbismuth bis acrylate
Allylbismuth bis methacrylate
Isopropenylbismuth bis p-vinylbenzoate
4-chloro-3-butenylbismuth bis acrylate, etc.

R may also be a cycloalkyl radical and preferably a monocyclic cycloalkyl radical, e.g. cyclohexyl, cycloheptyl, cylooctyl, cyclopentyl, etc. Preferably, R may be cyclohexyl. R may also be an inertly substituted cycloalkyl radical such as a chlorocyclohexyl, methylcyclohexyl, ethoxycyclohexyl, etc. radical. Preferred organobismuth compounds wherein R is cycloalkyl may include:

Dicyclohexylbismuth acrylate
Dicyclohexylbismuth methacrylate
Dicyclohexylbismuth p-vinylbenzoate
Cyclohexylbismuth bis ethacrylate
3-methylcyclohexylbismuth bis acrylate
Cyclohexylbismuth bis m-vinylbenzoate, etc.

R may be a monocyclic aryl radical including inertly substituted aryl radicals. For example, R may be a phenyl, chlorophenyl, tolyl, bromophenyl, xylyl, ethylphenyl, methoxyphenyl etc., radicals. Typical organobismuth compounds wherein R is an aryl may include:

Diphenylbismuth acrylate
Ditolylbismuth p-vinylbenzoate
Di-m-methoxyphenylbismuth acrylate
Diphenylbismuth ethacrylate
Tolylbismuth bis methacrylate
p-Chlorophenylbismuth bis acrylate
m-Ethylphenylbismuth bis p-vinylbenzoate, etc.

The organobismuth compound may be of the form $Ar_3Bi(OOCR')_2$ wherein Ar may be a monocyclic aryl radical, including inertly substituted aryl radicals. For example, Ar may be a phenyl, chlorophenyl, tolyl, bromophenyl, xylyl, ethylphenyl, methoxyphenyl, etc. radical. Typical organobismuth compounds of the formula $$Ar_3Bi(OOCR')_2$$

may include:

Triphenylbismuth bis acrylate
Tritolylbismuth bis methacrylate
Tri-p-chlorophenylbismuth bis p-vinylbenzoate
Tri-p-methoxyphenylbismuth bis acrylate
Triphenylbismuth bis methacrylate
Tritolylbismuth bis acrylate
Tri-m-chlorophenylbismuth bis acrylate, etc.

The novel organobismuth compounds of this invention may typically be prepared by reacting an acid R′COOH or reactive derivative thereof with a suitable organobismuth compound. Preparation of the trivalent bismuth compounds may be represented by the general equation:

$$R_aBiX_{3-a} + (3-a)MOOCR' \rightarrow R_aBi(OOCR')_{3-a} + (3-a)MX$$

wherein R, R′, and a are as defined supra, M is hydrogen or a metal, preferably an alkali metal or ammonium; and X is a replaceable group such as OH, Cl, O, etc. It will be apparent that when the replaceable group X is divalent, e.g. O, the organobismuth reactant will be of the form RBiX, i.e. RBiO. Suitable $R_aBiX_{3-a}$ compounds include di-n-butylbismuth chloride, diphenylbismuth hydroxide, octylbismuth oxide, phenylbismuth dichloride, etc. Suitable MOOCR′ compounds include acrylic acid, sodium methacrylate, sodium acrylate, sodium p-vinylbenzoate, ammonium methacrylate, ammonium acrylate, ammonium p-vinylbenzoate, etc.

Trivalent organobismuth compounds may also be produced by the reaction:

$$R_3Bi + (3-a)HOOCR' \rightarrow R_aBi(OOCR')_{3-a} + (3-a)RH$$

Where the desired product is a pentavalent organobismuth compound, the reaction employed may be:

$$Ar_3BiX'_2 + 2MOOCR' \rightarrow Ar_3Bi(OOCR')_2 + 2MX'$$

wherein Ar, R′, and M are as defined supra, and X′ is a replaceable group such as $CO_3$, O, OH, Cl, etc. It will be apparent that when X is divalent, e.g. O or $Co_3$, the organobismuth reactant will have the form $Ar_3BiX$, i.e. $Ar_3BiCO_3$.

These preparative reactions may preferably be carried out in the presence of a liquid diluent e.g. toluene, ether, aliphatic hydrocarbons, etc. Reaction temperatures may typically be about 15–120° C. and the use of agitation is preferred. The product organobismuth compound may be isolated by cooling and filtering the reaction mixture, by stripping off the liquid diluent, preferably under vacuum, etc.

The novel organobismuth compounds of this invention are characterized by their unexpectedly high biological activity, particularly against bacteria, including the highly resistant gram negative bacteria. The compounds of this invention are also unique in that they are capable of undergoing polymerization to give bacteriostatic agents of high activity and durability. The ability of these compounds to polymerize renders them suitable for areas of use in which prior art bacteriostats are generally unsatisfactory. For example, the organobismuth compound may be copolymerized with other monomers so that products formed therefrom may be rendered durably resistant to attack by bacteria. The organobismuth compounds may be homopolymerized to form a polymeric bacteriostat which may be applied to various surfaces as a solution, suspension, or the like to form thereon a tough, durable, bacteriostatic surface. Both homopolymers and copolymers may be employed in various organism-control compositions such as paints for hospitals, breweries and the like, anti-fouling paints, dusting preparations, disinfectants, etc.

In general, the organobismuth polymers may be prepared by various techniques of free radical polymerization. Thus, the polymerizations may be carried out in bulk, in solution, in emulsion, in suspension, etc. Due to the high melting points of many of the novel organobismuth monomers, suspension polymerization is generally preferred. Polymerization may be initiated by various suitable free radical initiators including benzoyl peroxide, di-t-butyl peroxide, lauroyl peroxide, cumene hydroperoxide, azo-bis-isobutyronitrile, methylethylketone peroxide, persulfate-bisulfite redox catalysts, persulfate-mercaptan redox catalysts, and the like. The polymerizations may be carried out at any suitable temperature, depending upon the catalyst system employed, but temperatures in the range of 40–120° C. are preferred. Polymerization temperatures in this range afford a good balance among rate of polymerizations, yield of polymer, molecular weight of polymer, and time of reaction. Various polymerization control agents such as accelerators, chain-transfer agents, surface active agents, suspending agents, and the like may also be employed if desired.

The organobismuth monomers may be homopolymerized, or they may be copolymerized with other ethylenically unsaturated comonomers. Ethylenically unsaturated monomers are those compounds containing copolymerizable carbon-to-carbon double bonds. Typical ethylenically unsaturated comonomers which may find use in the practice of this invention include vinyl monomers, e.g. vinyl chloride, vinyl acetate, vinylidene chloride, styrene, etc.; acrylic monomers, e.g. acrylic acid, ethyl acrylate, methyl methacrylate, acrylamide, acrylonitrile, methacrylamide, etc.; dienes, e.g. butadiene, isoprene, chloroprene, etc.; and other comonomers e.g. maleic acid, diethyl maleate, diethyl fumarate, etc. If desired, two or more organobismuth monomers of this invention may be copolymerized.

The ratio of organobismuth monomer to comonomer may be varied over wide limits, depending upon the desired end use of the products. Where the organobismuth polymer is to be used as a disinfectant, the organobismuth monomer will preferably be employed in a major amount, i.e. at least 50% by weight of the total polymer. Preferably, only enough comonomer will be used to obtain the desired solubility and/or physical properties. Generally, this may correspond to about 5–50%, preferably 5–25% say 10% comonomer.

Where the product polymer is intended to be used as a plastic, for example as a paint base, molding plastic etc., relatively small amounts of organobismuth monomer may be incorporated into the polymer to achieve the desired resistance to bacteria. Typically, the organobismuth monomer may constitute as little as 0.005% by weight of the polymer and preferably 0.005–5%, say 0.05%. Paints and other products formulated from these polymers may retain the desirable properties contributed by the comonomer and possess the added advantage of bacterial resistance.

The particular organobismuth monomer chosen may also be influenced by the desired end use of the polymer. All of the monomers of this invention are characterized by their ability to produce polymers having outstanding activity against bacteria. Polymerization of the difunctional organobismuth monomers e.g. phenylbismuth bis methacrylate, butylbismuth bis p-vinylbenzoate, propylbismuth bis acrylate, triphenylbismuth bis p-vinylbenzoate, etc. may result in a highly crosslinked, insoluble polymer. Monofunctional monomers such as dipropylbismuth p-vinylbenzoate, dioctylbismuth acrylate, dibutylbismuth methacrylate, etc. may produce linear polymers of greater solubility. Thus, the physical properties of the polymer may be advantageously modified by the choice of the organobismuth monomer.

Organobismuth-containing polymers and particularly those containing relatively major amounts of the organobismuth compound may be used per se in the protection of material against bacteria. When used per se, they will often be incorporated into the material during preparation and fabrication. They may also be used as adhesives; and for a surface coating, by dipping, padding, etc. Compositions in which the polymer is the active component may also be used for such applications. Liquid compositions may be utilized in which the bismuth containing polymer is dissolved and/or suspended in a solvent. Solid compositions may be utilized in which the bismuth containing polymer is mixed with a carrier, which may be e.g. an inert diluent. The carrier may be inert, such as talcs, clays, diatomaceous earth, flours, etc., or it may have activity such as that shown by the quaternary ammonium compounds. The liquid formulations of the emulsion type will often include a dispersion agent such as the anionic, cationic or nonionic surface active agents. To obtain fungicidal and/or bactericidal compositions having an extremely broad spectrum of activity, the bismuth containing polymers may be formulated with other active materials such as the triorganotins, pentachlorophenol, copper-8-quinolinolate, bisphenols, o-phenylphenol, polybrominated salicylanilides, and metal (e.g. zinc) dialkyldithiocarbamates. Plastics, textiles, paper products and paints are illustrative of the materials which are rendered resistant to attack when treated by applying the bismuth compound or polymer to the surface and/or by incorporating therein. The plastics in massive and in fiber form include urethanes, vinyl chloride-vinyl acetate copolymers, polyesters, polyamides, polyolefins, and natural synthetic rubbers. Natural fiber products which may be protected include paper products, hemp and felts. Paints may be protected "in the can" and also after application. Typical paints include interior and exterior vinyl latex and alkyd paints, the older non-synthetic flat natural paints, the acrylics, and the vinyls, and anti-fouling paints such as the acrylic and the vinyl varieties thereof. The bismuth compounds and polymers are also useful in preserving adhesives; in water treatment processes including secondary oil recovery processes; in paper mill slime control processes; and in methods for controlling *Staphylococcus aureus* in hospitals. They may be a useful and active component of detergent sanitizers and may be used for this and other purposes in the form of an aerosol material. A particularly useful application of the polymers containing a small amount of the organobismuth reactant is in the preparation of foams having germicidal properties. Polyvinyl chloride type foams, polystyrene foams, and the like, containing between about 0.1% and 2% of the organobismuth monomer, are useful in the manufacture of germicidal mattresses, cushions, etc. The organobismuth monomers may also be utilized in the same fashion as the organobismuth-containing polymers discussed in this paragraph and for the same purposes.

Practice of this invention may be observed from the following illustrative examples wherein all parts are parts by weight unless otherwise specified.

Example 1.—Phenylbismuth bis p-vinylbenzoate

Triphenyl bismuth (22 parts), p-vinylbenzoic acid (14.8 parts), and toluene (90 parts) were charged to a flask equipped with a stirrer and condenser. The mixture was refluxed for 2 hours, during which time the product monomer precipitated out as formed. The product was separated by filtration, washed with toluene and dried. The yield was 27.5 parts of phenylbismuth bis p-vinylbenzoate which melted with decomposition at 230° C.

Following the procedure of this example, phenylbismuth bis methacrylate and phenylbismuth bis acrylate were prepared. Phenylbismuth bis acrylate was isolated by stripping off the toluene under reduced pressure. This technique may be used to prepare other organobismuth compounds such as butylbismuth bis methacrylate, octylbismuth bis p-vinylbenzoate, cyclohexylbismuth bis acrylate, etc.

Example 2.—Diphenylbismuth methacrylate

Equimolar quantities of diphenylbismuth chloride and ammonium methacrylate were reacted by refluxing in benzene for four hours. The reaction product was filtered hot and the filtrate stripped to one-third its original volume. Diphenylbismuth methacrylate, melting with decomposition at 220° C. was obtained.

This procedure may be used to produce other organobismuth compounds such as dibutylbismuth methacrylate, diethylbismuth acrylate, dicyclohexylbismuth p-vinylbenzoate, etc.

Example 3.—Triphenylbismuth bis p-vinylbenzoate

Triphenylbismuth carbonate (0.02 mole) was mixed to a paste with 20 cc. of toluene and p-vinylbenzoic acid (0.04 mole) was added thereto with stirring. The mixture was placed on a hot plate and maintained at about 120° C. until carbon dioxide evolution ceased. Product triphenylbismuth bis-p-vinylbenzoate was filtered off and dried. The product melted with decomposition at 170–180° C. Analysis showed:

Theory: percent Bi, 28.5; saponification number, 152.4.
Found: percent Bi, 28.4; saponification number, 162.2.

When 0.04 mole of methacrylic acid replaced the p-vinylbenzoic acid, a yield of 80% of triphenylbismuth bis methacrylate, melting at 170° C. was obtained. Analysis showed:

Theory: percent Bi, 34.2; saponification number, 184.
Found: percent Bi, 34.3; saponification number, 193.

The novel organobismuth monomers prepared by the above noted procedures were tested for activity against various microorganisms including *Staphylococcus aureus*, *Aerobacter aerogenes*, *Pseudomonas aeruginosa* and *Candida albicans*. Their biological activity was found to be extremely high and growth of the organism in some cases was effectively controlled at concentrations of 1 part per million or less.

Example 4.—Phenylbismuth bis methacrylate (10 parts) was mixed with 0.1 part of benzoyl peroxide and 130 parts of toluene. The mixture was blended for five minutes in a Waring Blendor to obtain a smooth suspension of finely divided particles. It was then transferred to a flask which was purged with nitrogen. Polymerization was effected by heating the mixture overnight at temperature of 100° C. under a nitrogen atmosphere. At the end of this period it was refluxed for two hours, filtered, washed with toluene, and dried. A 92.5% yield of polymer was obtained. A comparison of the infra-red spectra of the monomer and the polymer showed substantially complete loss of the vinyl absorption peaks for the polymer.

Example 5.—Following the procedure of Example 4, phenylbismuth bis p-vinylbenzoate was polymerized. The polymer was obtained in 96% yield. Infra-red spectrum analysis showed that polymerization had taken place. This procedure may be employed to prepare polymers of other organobismuth monomers such as butylbismuth bis acrylate, triphenylbismuth bis methacrylate, dioctylbismuth p-vinylbenzoate, diphenylbismuth methacrylate, etc.

Example 6.—Equimolar parts of styrene and phenylbismuth bis p-vinylbenzoate were copolymerized according to the procedure of Example 4. Equimolar parts of the comonomers are equivalent to a composition by weight of 85% organobismuth monomer and 15% styrene. By varying the ratio of the comonomers, copolymers having different compositions may be obtained.

The organobismuth polymers of this invention may also be used for the control of microorganisms, particularly bacteria, because of their high biological activity. For example, the novel polymers have been found to effectively control the growth of *Staphylococcus aureus*.

Although this invention has been illustrated by reference to specific examples, modifications thereof which are clearly within the scope of the invention will be apparent to one skilled in the art upon reading the foregoing description.

I claim:

1. The process for controlling the growth of bacteria which comprises applying to the locus at which said control is desired an organobismuth compound selected from the group consisting of $R_aBi(OOCR')_{3-a}$ and $$Ar_3Bi(OOCR')_2$$

wherein R is selected from the group consisting of alkyl radicals of less than 20 carbon atoms, alkenyl radicals of less than 20 carbon atoms, cycloalkyl radicals and monocyclic aryl radicals; Ar is monocyclic aryl radical; R' is polymerizable radical selected from the group consisting of the vinyl, α-alkylvinyl and vinylphenyl radicals; and *a* is an integer less than 3.

2. The process for controlling the growth of bacteria as claimed in claim 1 wherein R is phenyl.

3. The process for controlling the growth of bacteria as claimed in claim 1 wherein R is butyl.

4. The process for controlling the growth of bacteria as claimed in claim 1 wherein the compound is phenylbismuth bis methacrylate.

5. The process for controlling the growth of bacteria as claimed in claim 1 wherein the compound is phenylbismuth bis p-vinylbenzoate.

6. The process for controlling the growth of bacteria as claimed in claim 1 wherein the compound is triphenylbismuth bis methacrylate.

7. The process for controlling the growth of bacteria as claimed in claim 1 wherein the compound is triphenylbismuth bis p-vinylbenzoate.

8. The process for controlling the growth of bacteria which comprises applying to the locus at which said control is desired an organobismuth polymer prepared by polymerizing at least one organobismuth compound selected from the group consisting of $R_aBi(OOCR')_{3-a}$ and $Ar_3Bi(OOCR')_2$ wherein R is selected from the group consisting of alkyl radicals of less than 20 carbon atoms, alkenyl radicals of less than 20 carbon atoms, cycloalkyl radicals and monocyclic aryl radicals; Ar is monocyclic aryl radical; R' is polymerizable radical selected from the group consisting of the vinyl, α-alkylvinyl and vinylphenyl radicals; and *a* is an integer less than 3.

9. The process for controlling the growth of bacteria as claimed in claim 4 wherein R is phenyl.

10. The process for controlling the growth of bacteria as claimed in claim 4 wherein R is butyl.

References Cited

UNITED STATES PATENTS

| 3,167,532 | 1/1965 | Leebrick | 260—429.7 |
| 3,268,395 | 8/1966 | Taylor | 167—30 |

ALBERT T. MEYERS, Primary Examiner

J. D. GOLDBERG, Assistant Examiner

U.S. Cl. X.R.

424—81, 296